(12) United States Patent
Radlow et al.

(10) Patent No.: US 8,393,634 B2
(45) Date of Patent: Mar. 12, 2013

(54) EASY ACCESS COLLAPSIBLE CART

(76) Inventors: Nicole Radlow, Holland, PA (US);
Edward Radlow, Holland, PA (US);
Melissa Radlow, Holland, PA (US)

( * ) Notice: Subject to any disclaimer, the term of this patent is extended or adjusted under 35 U.S.C. 154(b) by 131 days.

(21) Appl. No.: 12/861,340

(22) Filed: Aug. 23, 2010

(65) Prior Publication Data

US 2011/0049843 A1    Mar. 3, 2011

Related U.S. Application Data

(60) Provisional application No. 61/236,603, filed on Aug. 25, 2009.

(51) Int. Cl.
*B62B 1/00*    (2006.01)
(52) U.S. Cl. .......................... 280/651; 280/652
(58) Field of Classification Search ............. 280/42, 280/79.3, 651, 639, 47.35, 38, 30, 47.34, 280/652; 211/195, 201, 186, 187
See application file for complete search history.

(56) References Cited

U.S. PATENT DOCUMENTS

| | | | |
|---|---|---|---|
| 577,432 A | 2/1897 | Kratzet | |
| 1,131,559 A | 3/1915 | Schrek | |
| 1,409,787 A | 3/1922 | Scarlett | |
| 2,437,380 A | 8/1945 | Cooklin et al. | |
| 2,555,767 A | 6/1951 | Simonian | |
| 2,604,333 A | 7/1952 | Elmer | |
| 4,266,791 A | 5/1981 | Myers | |
| 4,824,137 A * | 4/1989 | Bolden | 280/652 |
| 5,222,748 A * | 6/1993 | Johnson | 280/47.34 |
| 5,806,864 A * | 9/1998 | Zielinski et al. | 280/79.3 |
| 6,267,393 B1 | 7/2001 | Mengrone et al. | |
| 6,443,481 B1 * | 9/2002 | Stravitz et al. | 280/651 |
| 7,360,783 B2 * | 4/2008 | Home | 280/639 |
| 7,377,538 B2 * | 5/2008 | Stuart et al. | 280/651 |
| 7,562,897 B1 * | 7/2009 | Sherman et al. | 280/651 |
| 7,731,221 B2 * | 6/2010 | Bess | 280/651 |
| 7,891,697 B1 * | 2/2011 | Fahrbach | 280/656 |
| 8,011,686 B2 * | 9/2011 | Chen et al. | 280/651 |
| 2004/0104560 A1 * | 6/2004 | Tedesco | 280/651 |
| 2008/0073880 A1 | 3/2008 | Bess | |
| 2008/0315734 A1 * | 12/2008 | Birsel et al. | 312/223.3 |

* cited by examiner

*Primary Examiner* — Hau Phan
(74) *Attorney, Agent, or Firm* — IP Works, PLLC

(57) ABSTRACT

A wheeled cart is easily disassembled and folded into a compact carrying case. A rectangular base receives four poles at its corners. Cross bars across the top of the poles each carry a pair of top and bottom panels which form the sides of the cart. Each of the bottom panels is preferably hinged to the bottom of its respective stationary top panel so that the bottom panel may be hinged upwardly to gain access to the bottom of the cart. A top most horizontal lid is detachably affixed to the poles at each of their top ends, said base, sides and lid defining a substantially enclosed volume for containing transported articles. In its disassembled, compacted form, the cart stores the detachable poles, cross bars, and panels.

14 Claims, 5 Drawing Sheets

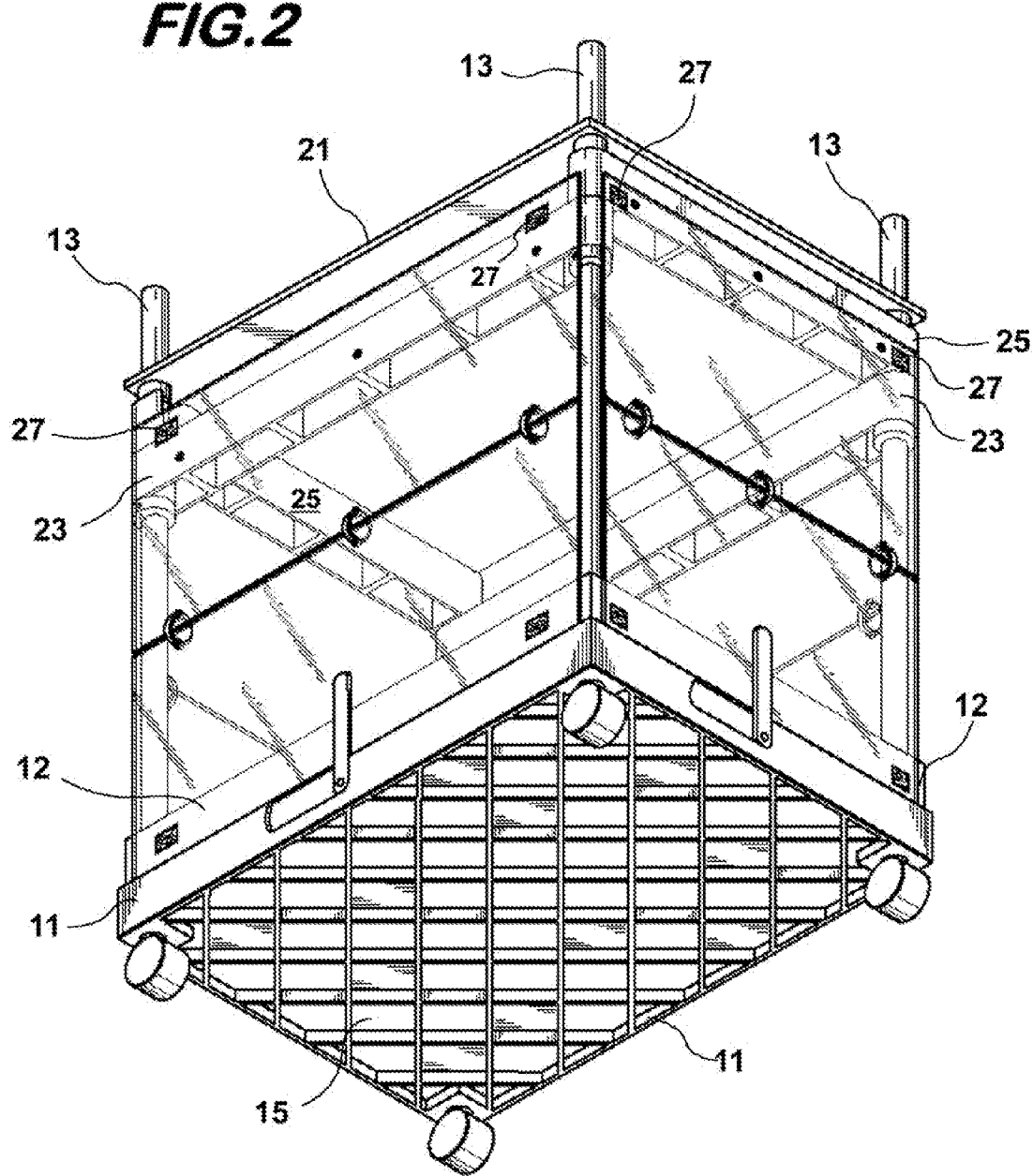

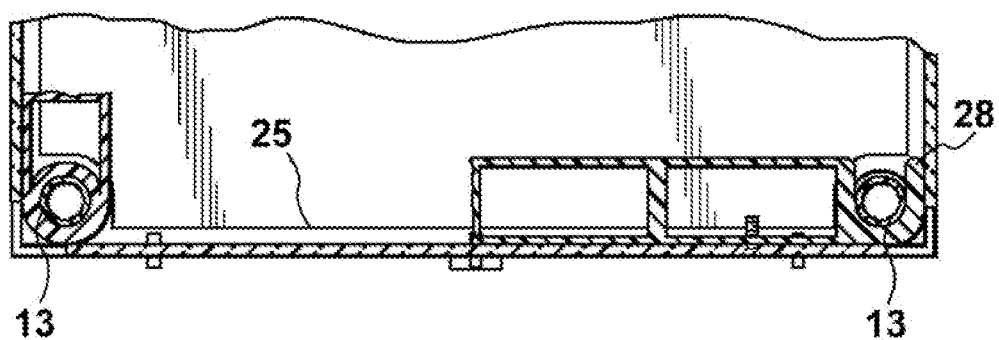
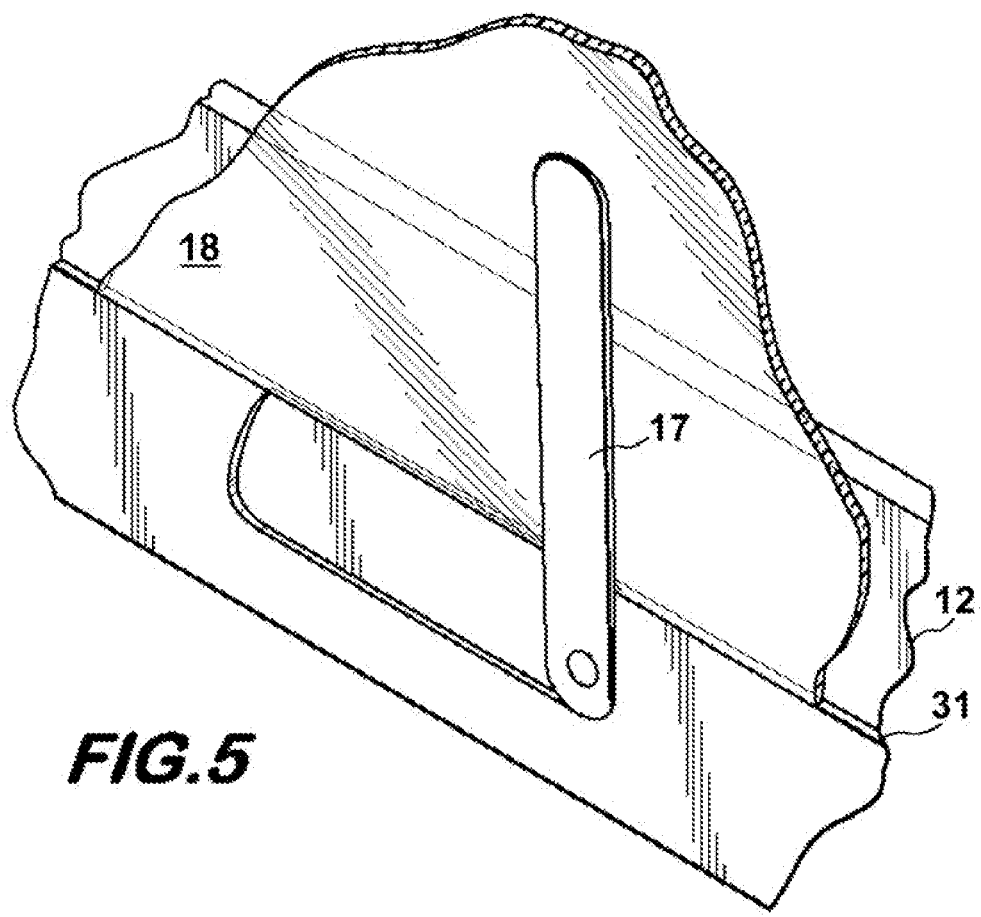

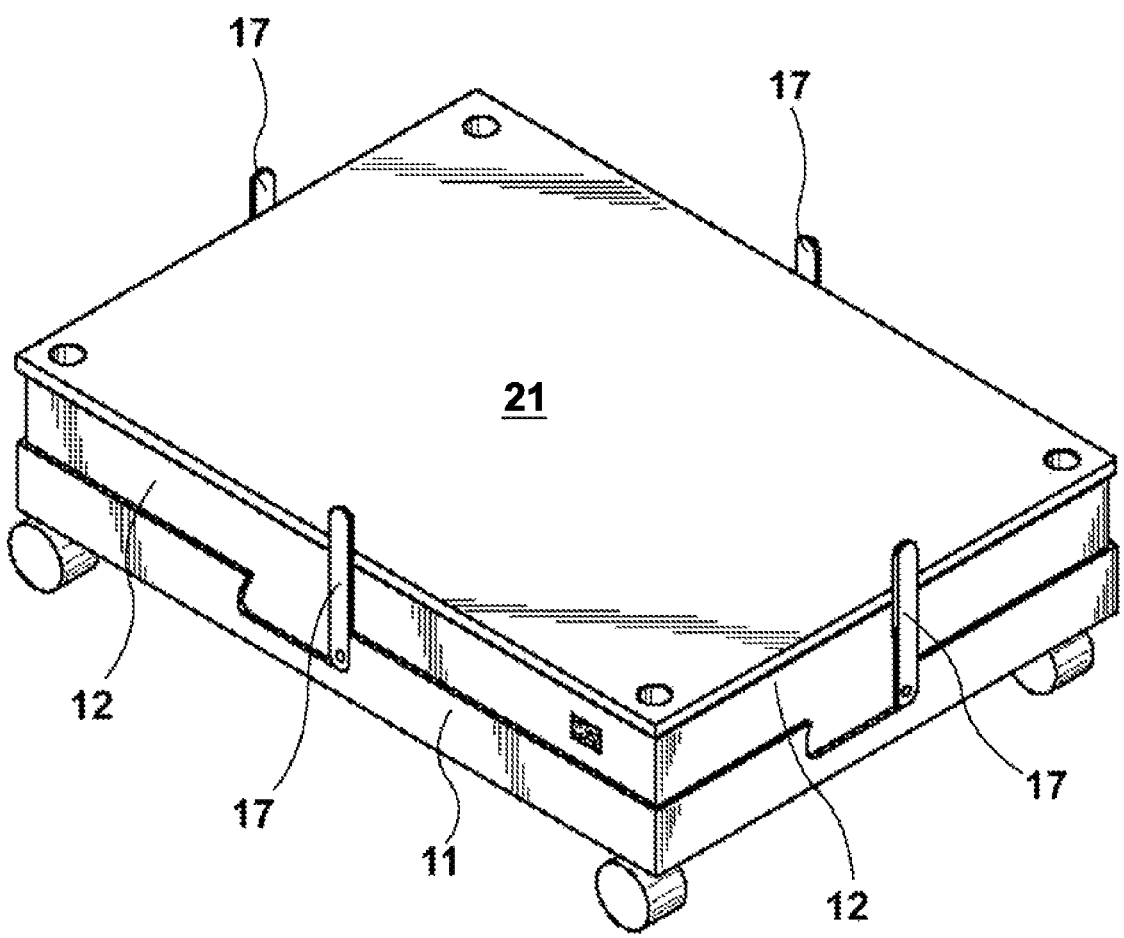

EASY ACCESS COLLAPSIBLE CART

RELATED APPLICATION

This patent application is related to provisional patent application Ser. No. 61/236,603 entitled "Easy Access Collapsible Cart" filed on Aug. 25, 2009, priority from which is hereby claimed.

FIELD OF THE INVENTION

The present invention relates to a collapsible and portable wheeled cart for transportation of goods such as clothing and personal items. It provides floor level access to items at the bottom of the cart and a collapsible structure which may be reduced to a carrying case for easy storage and shipping.

BACKGROUND OF THE INVENTION

When students arrive at their college living areas they have a car filled with heavy items such as refrigerator or microwave and bulky items such as big plastic boxes and light items such as big bags of clothes and assorted bedding. Ideally, they would want everything in their car to fit into a cart so they have only one trip to make from their car to their dormitory room. Thus, there is a need for providing easy transportation of items that are brought by college students to be moved into their college living spaces. Other carts are being used in an attempt to meet this need, however, they fail to offer sufficient load capacity, are inconvenient and not easy to use. There is therefore an unfulfilled need for a collapsible wheeled cart-in-a-case, which can easily and conveniently be assembled without tools from its carrying case into a cart with the dimensions and load capacity to transport the typical items found in common college living spaces on college campuses. Our cart is specifically designed for college move-ins and move-outs, as well as the physical layout of college campuses (e.g. elevators, dorm rooms, rough terrain).

SUMMARY OF THE INVENTION

In order to meet the needs in the field of carts for carrying of personal items, the present apparatus has been devised. It provides a wheeled cart that may be easily disassembled and folded into an extremely compact size that also forms a convenient carrying case for the various disassembled components (e.g. a cart-in-a-case). The apparatus is designed to be modular. A consumer can start with a base unit, which consists of a plastic base set on four wheels and acts like a dolly with seven-inch walls that can haul up to 150 lbs. For those wanting more than a dolly, the consumer can purchase the additional components that make it a fully assembled cart.

In accordance with one embodiment, these components enable the dolly to be assembled into a full cart by installing four poles that are pushed into four holes at each of the corners of the rectangular base. Inserted onto these poles are cross bars that have panels on all four sides. This forms the body of the cart, which includes two opposing short sides and two opposing long sides that conform to the dimensions of the rectangular base respectively. The short sides of the cart function like doors which can swing open and closed on one of each side's corner poles to allow easy access from a side elevation. The longer sides of the cart are fixed and do not swing open. Each side is composed of two panels, a stationary upper panel that is hinged to a moveable lower panel that can flip up so that items on the bottom of the cart can easily be accessed. This provides 360-degree access to the contents of the cart so it can be emptied by multiple people from all sides in an ergonomic way. The swing doors on the short sides are rotatably yet non-releasably attached to the corner uprights for added structural support. A lid forms a top surface of the cart which adds further structure to the assembly and can be used as a support surface for light items placed on top of the cart as well as forming a closure to contain the articles within and help protect them from inclement weather.

The individual components may be manually disconnected when disassembled so that the result is a very compact, suitcase-like box. This configuration is particularly convenient to use for many reasons. When empty, the cart/suitcase can be easily carried downstairs, or many students can fit into the elevators while carrying their cart-in-a-case. This has the advantage of preventing one student taking up an entire elevator space with an empty cart that cannot be disassembled. Because of its collapsible nature, this cart can fit anywhere in a car (like the trunk or back seat) and taken to colleges, senior living, vacation spots or anywhere one might need to transport items easily and quickly. The cart can be kept in colleges, folded up and stored away and taken out during times of students moving in and out. A student can keep this cart folded up in their living space to be used whenever they need it. It can be picked up and ready to go when a parent is coming to pick them up. Due to the compact dimensions of the cart and a total weight of the contents in the case of less than 50 lbs., they can easily be shipped in multiple units and stored in bulk at various locations.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a bottom front right isometric view.

FIG. 3 is a top plan sectional view taken from FIG. 1 as shown in that Figure.

FIG. 5 is a partial cut-away close-up view taken from FIG. 1 as shown in that Figure.

FIG. 6 is a top right front isometric view of the invention in its compacted state.

DESCRIPTION OF THE PREFERRED EMBODIMENT

Figure 1:
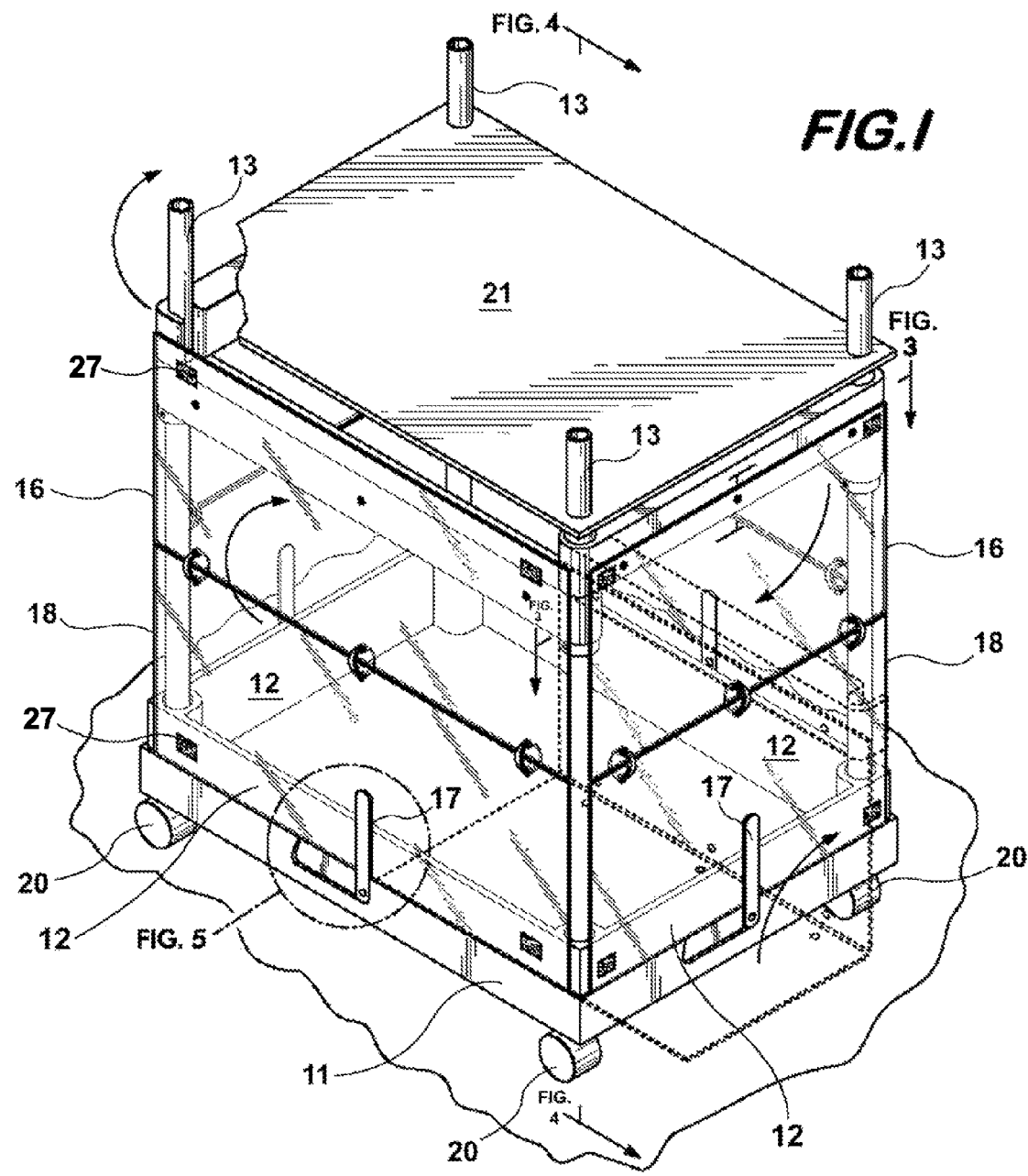
FIG. 1 is a top right front isometric view of the cart of the invention.

In accordance with the foregoing explanation, one embodiment of the collapsible wheeled cart of the invention will now be described. Referring to FIG. 1, the main components of the present cart include a unitary base 11 preferably composed of a strong and lightweight material such as plastic. The base includes integral side rails 12 that add to the structural integrity of the assembly. Four corner-located upright poles 13 are plugged into apertures in the base by press fit. The assembled cart is enclosed on four sides by a total of eight panels, each side comprising a top stationary panel 16 and a bottom panel 18 which is hinged to the top panel along a horizontal joint approximately at the mid-line. Holding the hinged bottom panels closed are pivoting latches 17 which extend from the base across the bottom edge. Holding the hinged bottom panels open are Velcro®-type hook and loop attachment means 27 located at each corner of the bottom edge of the bottom panel 18 and at each corner of the top edge of the top panel 16. Four industrial-type wheels 20 are located at each corner extending from the bottom of the base. A top lid 21 forms a closure and also provides an alternate horizontal support surface.

Referring now to FIG. 2, this bottom view reveals further detail of the assembly of parts as described in FIG. 1. The base 11 and side rails 12 are preferably unitary and molded from plastic. The relief cavities 15 as shown in this Figure provide a lightweight structure while providing an economy of mold material. Cross bars 23 extend between corner poles 13 along the top of the long sides and swing arms 25 extend along the top of the short sides. The use of cylindrical poles 13 as uprights also provides the functionality of hinge pins for the swing doors at the short side ends of the cart. Each swing door is constructed of a stationary top panel suspended from and permanently attached to a swing arm 25 and a bottom panel 18 which is hinged to the top panel along a horizontal joint approximately at the mid-line. Each long side is constructed of a stationary top panel suspended from and permanently attached to a cross bar 23 and a bottom panel 18 which is hinged to the top panel along a horizontal joint approximately at the mid-line. Velcro®-type attachment means 27 provide the functionality of releasably fixing the hinged lower panel 18 to the upper panels 16 when in the open position such that the bottom of the interior of the cart may be easily accessed. The top lid 21 is assembled by simple fitment over the poles 13 through appropriate locating holes.

Referring now to FIG. 3, a top plan sectional view shows the configuration of the right side swing arm 25 from which the hinged panels of the door are suspended. The end of the swing arms include a snap-fit catch 28 which locks the free end of the swing arm in place around its attached corner pole 13.

Figure 4:
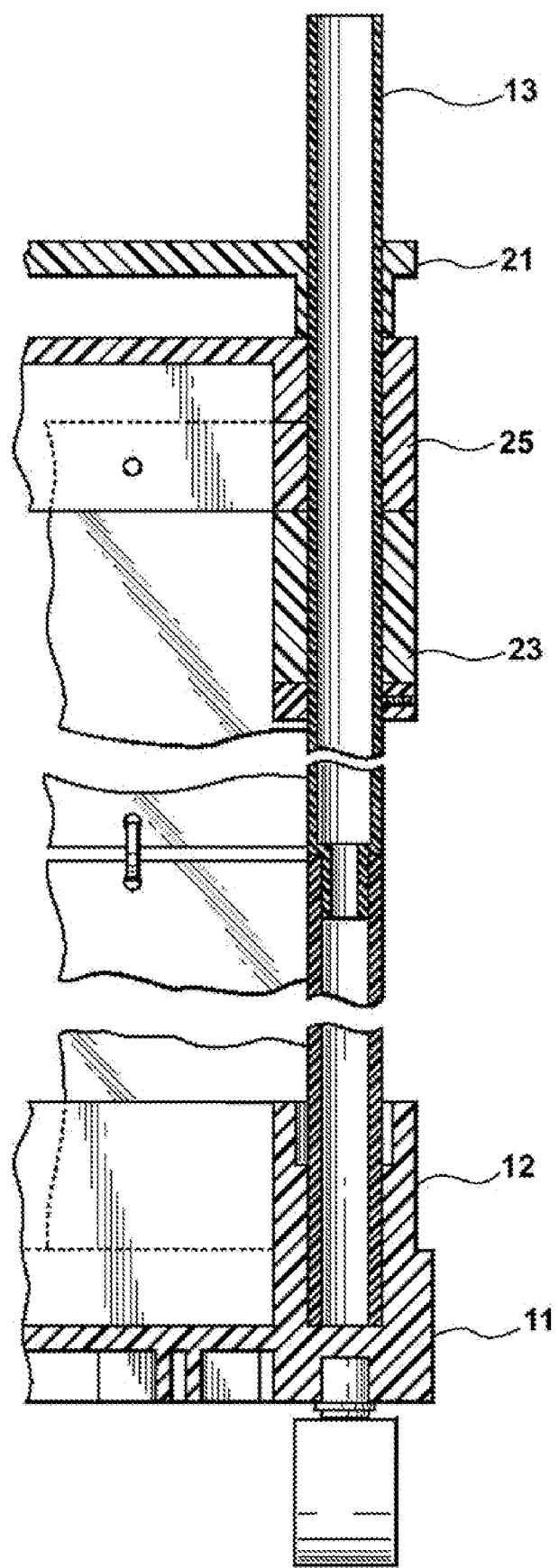
FIG. 4 is a side elevational sectional view taken from FIG. 1 as shown in that Figure.

Greater detail of the interfitting of the corner poles secured to the top bars and base is shown in FIG. 4. Each pole carries various structural components of the invention which extend along each side. Deep socketing of the poles 13 into the various components such as lid 21, swing arm 25, cross bar 23 and base 11 with its integral side rails 12 account for the sturdy construction of the cart when assembled.

FIG. 5 shows a simple pivoting latch arm 17 which holds the bottom hinged panel 18 in place. Top portions of the side rails 12 of the base are offset to allow for the thickness of the panel which rests on a ledge 31 formed by the offset.

Referring now to FIG. 6, the present cart is shown fully disassembled and arranged into its carrying case configuration. The vertically extending side rails 12 of the base 11 form a cavity which receives the uprights and disassembled panels while the planar lid member 21 is lowered to rest against the top surface of the side rails 12. The top member 21 is then secured by the resilience of the latch arms 17 which are shown in this illustration in their fully extended vertical position and locked into the lid. The case preferably includes a carrying handle (not shown). In this configuration, the case may also be used as a dolly to support larger items.

In operation, assembly of the cart is carried out in the following steps:
1) Remove the lid;
2) Put the four poles in the receiving holes of the base;
3) Slide the two long cross bars, which already have the upper and lower side panels attached, onto the corner poles;
4) Slide the two short cross bars, which already have the upper and lower side panels attached to the swing arms and function as doors, onto their respective poles; and
5) Move the latches up so they hold the hinged panels in place.

The cart is ready to be filled, putting the lid into the cart with the other items or on top of the cart as an additional horizontal support surface.

When not in use, the cart can be disassembled with the detachable parts stored inside it so that the result is a compact, suitcase-like box by following these steps:
1) Remove the lid;
2) Slide off the short cross bars that function as doors and fold up the lower panel;
3) Slide off the long cross bars and fold up the lower panel;
4) Place the long and short cross bars with the lower panels folded up into the cavity of the base unit;
5) Pull out the poles from each corner of the base and put them into the base cavity;
6) Put the lid on the top of the base to enclose the components in the base cavity and move the latches into their upright position.

Thus, the present invention has great utility and efficiency. The cart will hold heavy items because the base is sturdy and rigid and can be used as a dolly, but unlike a dolly the cart may be used in a configuration in which it provides an enclosure with sides and a top so that loose items may be piled in without falling out. The end doors hinge open and the bottom panels hinge upwardly for easy loading and unloading.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is:

1. A wheeled transport cart, comprising:
   a base having wheels for rolling ground support thereof;
   a plurality of upright poles detachably affixed to said base;
   a plurality of cross bars detachably affixed to each pole near top ends of said poles;
   a plurality of sides each extending laterally between adjacent poles, each side consisting of a stationary top panel and a bottom panel, each of said top panels being secured to one of said cross bars;
   a topmost horizontal lid detachably affixed to said poles at each of their top ends, said base, sides and the lid defining a substantially enclosed volume for containing transported articles; and
   a bottom panel on at least one of said sides horizontally hinged to the top panel on said at least one side such that the bottom panel is upwardly rotatable from a closed position to an open position, said open position allowing access to the enclosed volume of said cart.

2. The transport cart of claim 1 further including vertically extending side rails integral with said base located around a periphery thereof, said side rails having means for securing said bottom panels in the closed position.

3. The cart of claim 2 wherein at least one of said cross bars is a swing bar hingedly attached to one of said poles such that the side defined by said swing bar and the panels attached to it are selectively moveable together as a unit between open and closed horizontal positions for side access to said enclosed volume.

4. The cart of claim 3 wherein said base is rectangular.

5. The cart of claim 4 wherein the poles are press-fit into receiving sockets in said base.

6. The cart of claim 5 wherein said poles are detachably affixed at the corners of said base.

7. The cart of claim 1 wherein said lid is rigid and substantially planar.

8. A wheeled transport cart, comprising:
- a base having wheels for rolling ground support thereof;
- a plurality of upright poles detachably affixed to said base;
- a plurality of cross bars detachably affixed to each pole near top ends of said poles;
- a plurality of sides each extending laterally between adjacent poles, each side consisting of a stationary top panel and a bottom panel, each of said top panels being secured to one of said cross bars;
- a topmost horizontal lid detachably affixed to said poles at each of their top ends, said base, sides and the lid defining a substantially enclosed volume for containing transported articles;
- a bottom panel on at least one of said sides horizontally hinged to the top panel on said at least one side such that the bottom panel is upwardly rotatable from a closed position to an open position, said open position allowing access to the enclosed volume of said cart;
- said cart further including vertically extending side rails integral with said base located around a periphery thereof, said side rails having means for securing said bottom panels in the closed position;
- wherein at least one of said cross bars is a swing bar hingedly attached to one of said poles such that the side defined by said swing bar and the panels attached to it are selectively moveable together as a unit between open and closed horizontal positions for side access to said enclosed volume;
- wherein the poles are press-fit into receiving sockets in said base;
- wherein said poles are detachably affixed at the corners of said base; and
- wherein the top and bottom panels on at least one side include temporary fastening means for holding said bottom panel in the open position adjacent to the top panel.

9. The cart of claim 8 further including attachment means for affixing said lid directly to the top of said base side rails when said poles, sides and cross bars are detached, such that a closed volume defined by said lid, said base and said side rails when affixed directly together is sufficient to store said poles, sides and cross bars.

10. A disassembled and compacted transport cart of claim 9 wherein the detachable elements of the cart namely said poles, sides and cross bars are located within the closed volume defined by said lid, said sides and said base.

11. The cart of claim 10 wherein said base is unitary and composed of plastic.

12. The cart of claim 11 wherein substantially all of the elements of the cart are composed of plastic.

13. The cart of claim 10 wherein said lid is composed of plastic.

14. The cart of claim 8 wherein said temporary fastening means is hook and loop fasteners.

\* \* \* \* \*